United States Patent
Krontz et al.

(10) Patent No.: US 7,035,953 B2
(45) Date of Patent: Apr. 25, 2006

(54) COMPUTER SYSTEM ARCHITECTURE WITH HOT PLUGGABLE MAIN MEMORY BOARDS

(75) Inventors: Jeoff M. Krontz, Tomball, TX (US);
Kevin G. Depew, Kingwood, TX (US);
John D. Nguyen, Cypress, TX (US);
David F. Heinrich, Tomball, TX (US);
David W. Engler, Cypress, TX (US);
Vincent Nguyen, Sugarland, TX (US);
Randolph O. Dow, Waller, TX (US);
Owais Kidwai, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 10/179,001

(22) Filed: Jun. 25, 2002

(65) Prior Publication Data

US 2003/0208654 A1 Nov. 6, 2003

Related U.S. Application Data

(60) Provisional application No. 60/377,863, filed on May 3, 2002.

(51) Int. Cl.
*G06F 13/00* (2006.01)
(52) U.S. Cl. .................. 710/302; 710/301; 710/312
(58) Field of Classification Search ........ 710/300–303, 710/312, 305; 714/5
See application file for complete search history.

(56) References Cited

U.S. PATENT DOCUMENTS

| | | | | |
|---|---|---|---|---|
| 4,010,450 A | * | 3/1977 | Porter et al. ............... | 714/5 |
| 4,829,168 A | * | 5/1989 | Nakahara ................. | 235/489 |
| 4,868,373 A | * | 9/1989 | Opheij et al. .............. | 235/380 |
| 5,210,716 A | * | 5/1993 | Takada .................. | 365/185.09 |
| 5,594,873 A | * | 1/1997 | Garrett .................... | 710/300 |
| 5,731,629 A | * | 3/1998 | Woodward ................ | 257/679 |
| 5,826,068 A | * | 10/1998 | Gates ..................... | 713/600 |
| 5,928,367 A | * | 7/1999 | Nelson et al. ............. | 714/6 |
| 5,943,482 A | | 8/1999 | Culley et al. ............. | 395/283 |
| 5,948,090 A | * | 9/1999 | Heinrich et al. .......... | 710/302 |
| 5,991,833 A | * | 11/1999 | Wandler et al. ........... | 710/52 |
| 6,047,343 A | * | 4/2000 | Olarig .................... | 710/302 |
| 6,061,754 A | * | 5/2000 | Cepulis et al. ............ | 710/312 |
| 6,070,207 A | * | 5/2000 | Bell ...................... | 710/302 |

(Continued)

FOREIGN PATENT DOCUMENTS

JP 09128511 A * 5/1997

(Continued)

OTHER PUBLICATIONS

Schofield, Jack, "Time to Get Ready for the Next Round of Upgrades—Microcomputers—Industry Trend or Event," Nov. 23, 2000, Computer Weekly, available at www.findarticles.com.*

(Continued)

*Primary Examiner*—Rehana Perveen
*Assistant Examiner*—Nimesh G. Patel

(57) ABSTRACT

The specification discloses a server system implementing hot pluggable memory boards in an architecture using X86 processors and off-the-shelf operating system, such as Windows® or Netware, which do not support hot plugging operations. Thus, the specification discloses systems and related methods for hot plugging main memory boards transparent to, and without the help of, the operating system. The operating system need only have the ability to recognize additional memory in order to use it. Moreover, the specification discloses a related set of memory error detection and correction techniques, again which are implementing transparent to, and without the help of, the operating system.

44 Claims, 6 Drawing Sheets

U.S. PATENT DOCUMENTS

| | | | |
|---|---|---|---|
| 6,101,322 A | 8/2000 | Goodrum et al. | 395/282 |
| 6,177,808 B1* | 1/2001 | Heinrich et al. | 326/57 |
| 6,182,159 B1* | 1/2001 | Urabe | 710/2 |
| 6,189,058 B1* | 2/2001 | Jones, III et al. | 710/302 |
| 6,226,700 B1* | 5/2001 | Wandler et al. | 710/312 |
| 6,338,107 B1 | 1/2002 | Neal et al. | 710/103 |
| 6,363,452 B1* | 3/2002 | Lach | 710/316 |
| 6,401,157 B1 | 6/2002 | Nguyen et al. | 710/302 |
| 6,421,755 B1* | 7/2002 | Rao | 710/302 |
| 6,487,623 B1 | 11/2002 | Emerson et al. | 710/302 |
| 6,618,782 B1* | 9/2003 | Gulick et al. | 710/305 |
| 6,629,184 B1* | 9/2003 | Berg et al. | 710/306 |
| 6,701,403 B1* | 3/2004 | Lary et al. | 710/305 |
| 6,823,419 B1* | 11/2004 | Berg et al. | 710/306 |
| 6,838,759 B1* | 1/2005 | Liu | 257/679 |
| 2001/0001871 A1 | 5/2001 | Shrader et al. | 711/114 |
| 2002/0002651 A1 | 1/2002 | MacLaren et al. | 711/102 |
| 2002/0010875 A1 | 1/2002 | Johnson et al. | 714/5 |
| 2002/0042893 A1 | 4/2002 | Larson et al. | 714/7 |
| 2002/0129186 A1 | 9/2002 | Emerson et al. | 710/302 |
| 2003/0167367 A1* | 9/2003 | Kaushik et al. | 710/302 |

FOREIGN PATENT DOCUMENTS

| | | | |
|---|---|---|---|
| JP | 09212615 A | * | 8/1997 |
| JP | 11232882 A | * | 8/1999 |

OTHER PUBLICATIONS

Cassell, Jonathan, "Intel to Unveil Pentum III Xeon MPU: Targets Servers, Workstations—Product Announcement," Mar. 15, 1999, Electronic News, available ata www.findarticles.com.*

"ServerWorks Ships "Grand Champion" Chipset," Mar. 2002, Extreme Tech, available at www.findarticles.com.*

"Pericom: PI5C34171C—17-Bit to 34-Bit, Demux PCI Hot-Plug Bus Switch with -2V Undershoot Protection," Nov. 15, 2000, Pericom.*

"The I2C-Bus Specification, Ver. 2.1," Jan. 2000, Philips Semiconductors.*

Product Data Sheet; "5-Bit Multiplexed/1-bit Latched for 6-bit I²C EEPROM," PCA 9559; Philips Semiconductors, May 24, 2002 (9 p.).

* cited by examiner

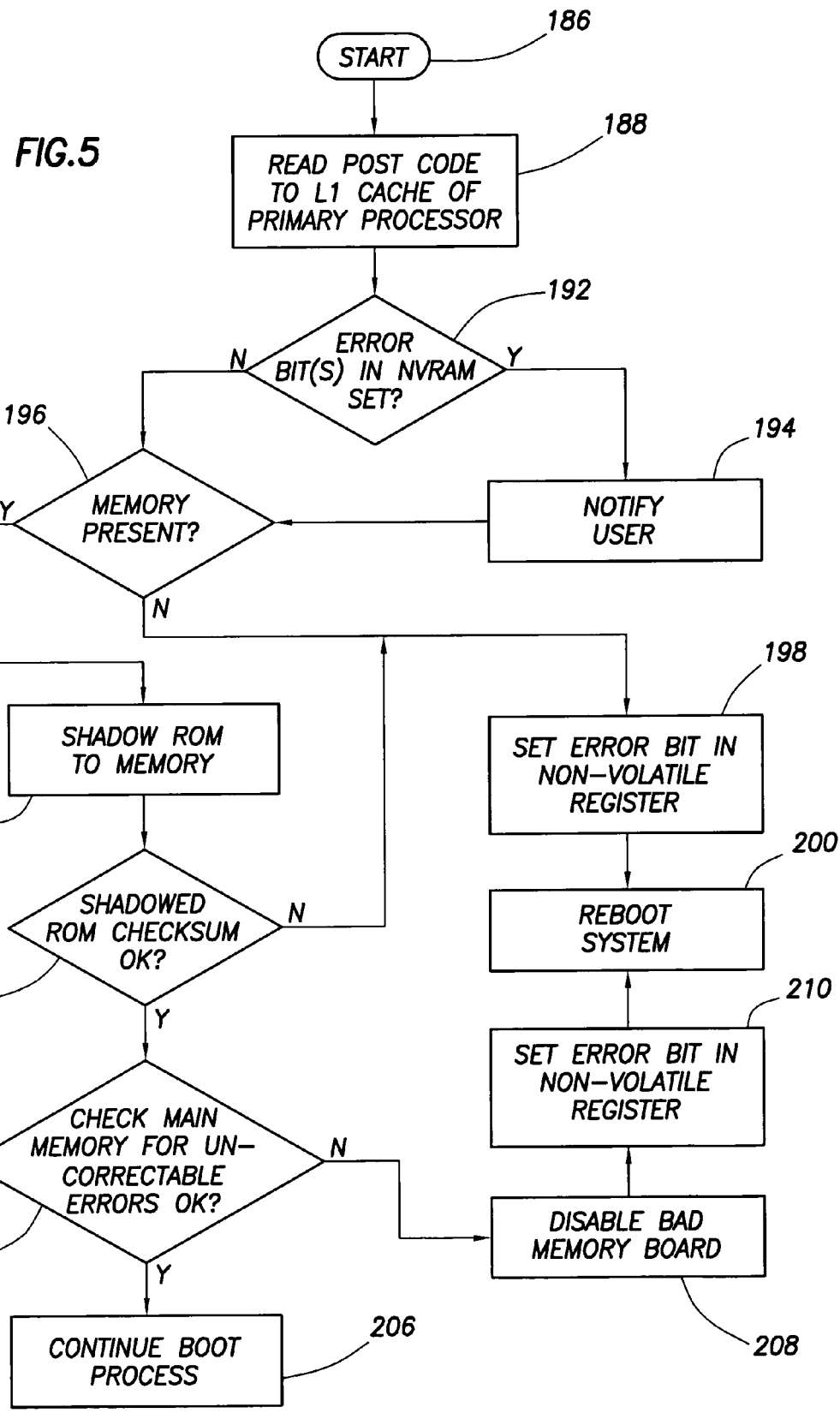

# COMPUTER SYSTEM ARCHITECTURE WITH HOT PLUGGABLE MAIN MEMORY BOARDS

CROSS-REFERENCE TO RELATED APPLICATIONS

This specification claims the benefit of Provisional Application Ser. No. 60/377,863 filed May 3, 2002, titled "Advanced Memory Protection," which is incorporated by reference herein as if reproduced in full below. Further, this specification is related to application Ser. No. 10/178,981, filed Jun. 25 2002, titled "Hot Mirroring in a Computer System With Redundant Memory Subsystems," which is also incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to computer systems and computer system architectures for implementing hot pluggable main memory. More particularly, the preferred embodiments are directed to servers having an architecture that supports hot pluggable memory boards with features such as hot spare, main memory mirroring, and the like. More particularly still, the preferred embodiments are directed to implementing hot pluggable memory boards in computer system running under X86 system architectures with off-the-shelf operating systems such as Windows® by Microsoft, Inc 2. Background of the Invention Most home computer systems implement an X86 architecture running either an Intel microprocessor, for example, an Intel Pentium 4 microprocessor, or processors of one of the competitors of Intel, such as Applied Micro Devices (AMD). Further, for the most part, home computers also use Microsoft products as the operating system, typically some form of the Windows® operating system. However, Microsoft also makes a Windows® operating systems for use in server systems.

Most operating system manufacturers offer their operating systems as relatively unmodifiable. That is, while providing operating systems for computers, rarely, if ever, will the operating system manufacturer modify the operating systems at the request of Original Equipment Manufacturers (OEMs) such as Hewlett Packard, Dell, and the like. Because of this rigidity in meeting the requests of servers system OEMs, in the related art computer manufacturers wishing to implement systems with non-standard architectures and features had to develop their own operating systems, or supply their servers with operating systems provided by other operating system manufacturers. For example, the ability to recover from a main memory error would be a desirable feature in a server, but currently available off-the-shelf operating systems for servers do not support the functionality necessary to accomplish this task.

Customers who purchase server equipment, however, prefer working with known or familiar systems, such as the Windows®-based system. Because of this familiarity, individuals and corporations who purchase server systems prefer, and seek out vendors who offer, servers running the familiar operating systems. Competition in the server marketplace is fierce, and therefore, each server manufacturer looks for ways to add features to offered server products which distinguish the server products from their competitor's products. Without the support of the operating system manufacturer, however, it is difficult to implement server features such as hot pluggable main memory, main memory error recovery, mapping out of failed main memory after watch dog timer time out, swapping to hot spare memory after experiencing correctable and non-correctable failure of the primary memory, logging of main memory errors for later trouble-shooting purposes, and the like.

Thus, what is needed in the art, to distinguish the various server products which use X86 architectures and Microsoft operating systems, is a way to provide features for server equipment, such as the various main memory features discussed immediately above, in spite of the rigidity associated with using an off-the-shelf operating system.

BRIEF SUMMARY OF SOME OF THE PREFERRED EMBODIMENTS

The problems noted above with respect to implementing main memory error recovery features in server systems using packaged or off-the-shelf operating systems, and X86 processing technology, are solved in large part by a computer or server system implementing an architecture where hot pluggable main memory boards may be inserted and removed during operation of the server. In the preferred embodiments, the hot pluggable aspects of the memory are implemented without the knowledge of (are transparent to) the operating system by implementing the features with a combination of hardware devices and read only memory (ROM) code brought to bear by the issuance of system management interrupt (SMI) signals. Thus, implementing the hot pluggable memory board architecture of the preferred embodiments may be accomplished in spite of the fact the operating system of the server does not directly support these features.

The multiple memory boards of the preferred embodiment may be operated in many different modes. For example, if a server system has two memory boards installed, the total memory provided by the two memory boards may be continuously addressed memory space, and thus, all the memory would be available for programs executing on the server. Alternatively, one of the boards may be designated as the primary memory, and the second board may be operated in a mirrored mode. In this way, if uncorrectable errors occur in the memory of the primary memory board, the system may simply retrieve the information from the mirrored main memory board. Alternatively, in a system having at least two main memory boards, one of the memory boards may be designated as a hot spare. In this case, as the number of correctable errors in an active memory board reaches a threshold (total number of correctable errors over time, or preferably the rate of correctable errors), then the hot spare may be activated and (after copying of data from the previously designated primary main memory board), the hot spare memory board becomes operational, and the main memory board experiencing errors may be deactivated. As yet another alternative, a bank of memory on a memory board could be designated as a hot spare for use if another bank, on either of the memory boards, fails.

Relatedly, the specification discloses an embodiment where correctable errors in the main memory are logged to a non-volatile portion of the random access memory (RAM) by use of the Serial Presence Detect (SPD) system. That is, as errors occur within particular Dual Inline Memory Modules (DIMM), the errors are logged to the SPD bytes of the DIMM. When the failures are analyzed at a later time, for example during warranty repair, the entity performing the warranty work or maintenance has greater access to the failure mode that generated the error.

In yet another embodiment, a computer or server system constructed in accordance with the preferred embodiments implements the ability to "map out" bad memory identified during operating or during power on self test (POST) procedures. In other words, memory that is not detectable during the POST procedure, or a portion of which may be found to be inoperable (experiencing uncorrectable errors), may be mapped out of the available memory area during the power-on self test procedure. Relatedly, the specification discloses that if the computer or server is rebooted based on a watch-dog timer time out (indicating that the computer or server has locked up) caused by main memory errors, the memory causing the lock up is mapped out of the available memory area.

BRIEF DESCRIPTION OF THE DRAWINGS

For a detailed description of the preferred embodiments of the invention, reference will now be made to the accompanying drawings in which:

FIG. 5 shows a flow diagram regarding detecting and correcting memory errors during the power on self test procedures.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
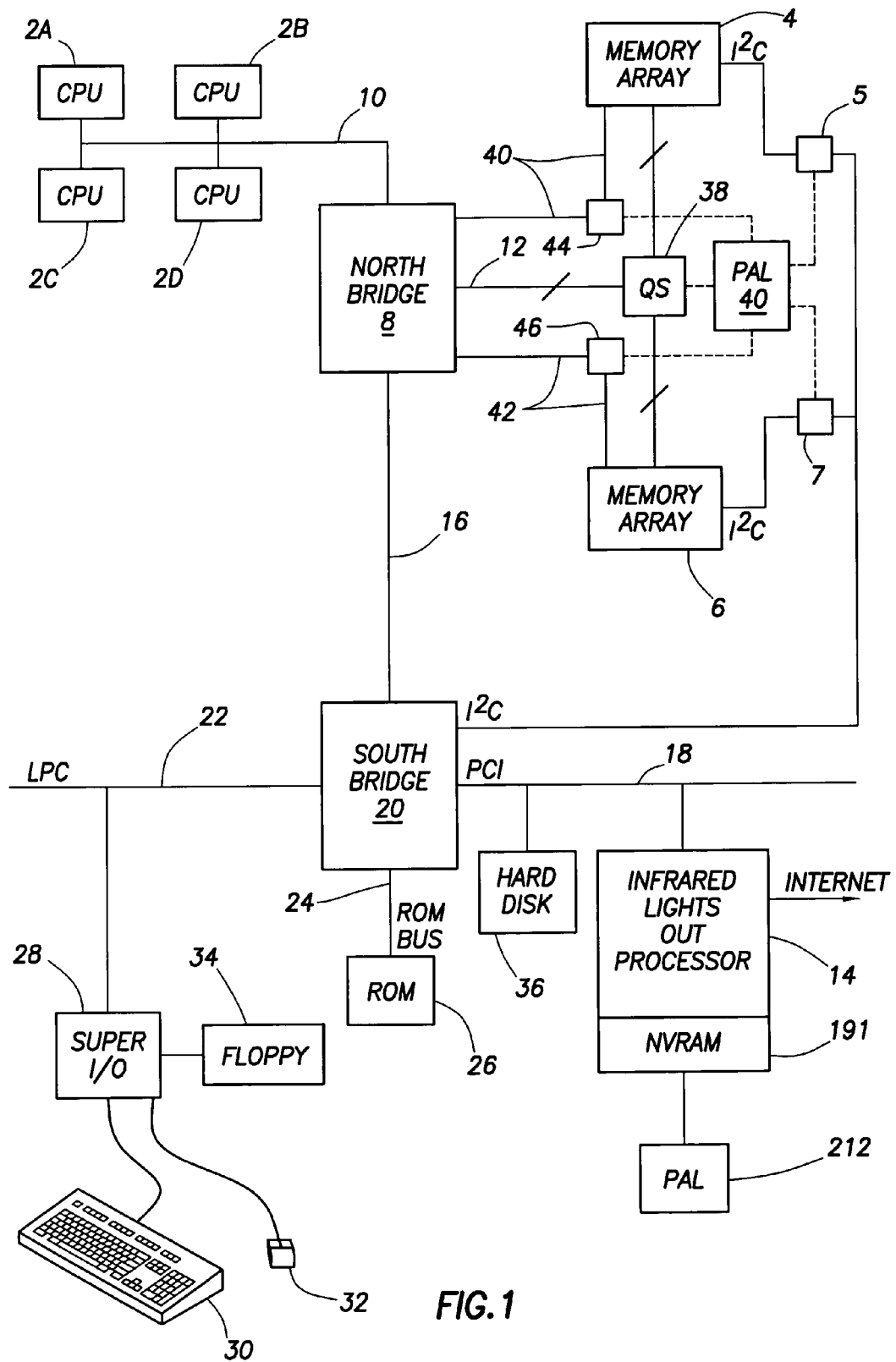
FIG. 1 shows, in block diagram form, a server system implemented in accordance with the preferred embodiments.

FIG. 1 shows a server system implemented in accordance with the preferred embodiments. In particular, the server of the preferred embodiments has a plurality of microprocessors or central processing units (CPUs) 2A–D coupled to a main memory array, which in the preferred embodiments is implemented using random access memory (RAM) on one or more memory boards 4, 6. The microprocessors to-couple to the main memory 4, 6 by way of a north bridge 8. In the preferred embodiments, the microprocessors are Intel® Pentium® 4 XEON microprocessors; however, any suitable microprocessor or array of microprocessors may be used without departing from the scope and spirit of the invention. The microprocessors couple to the north bridge 8 by way of a host bus 10.

The main memory arrays 4, 6 preferably couple to the north bridge 8 through a memory bus 12. The north bridge 22 preferably comprises a memory control unit (not shown) that controls transactions to the main memory arrays 4, 6 by sending the necessary control signals during memory accesses. As will be discussed more fully below, the main memory arrays 4, 6 function as the working memory for the CPUs 2 and comprise a memory device or array of memory devices in which programs, instructions and data are stored. The main memory arrays 4, 6 may comprise any suitable type of memory such as dynamic random access memory (DRAM) or any of the various types of DRAM devices such as synchronous DRAM (SDRAM), extended data output DRAM (EDO-DRAM), double-data-rate SDRAM (DDR SDRAM), and the like. In the preferred embodiments however, the main memory arrays 4, 6 are implemented using DDR SDRAM packaged in dual inline memory modules (DIMMs).

The server system of the preferred embodiments may also comprise a graphics controller or video driver that couples to the north bridge 8 by way of a Advanced Graphics Port (AGP) bus (not shown), or some other suitable type of bus. Inasmuch as the computer system shown in FIG. 1 is preferably used as a server, the system may not have a dedicated video driver and video display, and instead user interface information may flow to and from the server system through the integrated lights-out (iLo) processor 14. If the server system does, however, implement a dedicated video driver, this video driver may be alternatively couple to the primary expansion bus 16 or one of the secondary expansion buses, for example the PCI bus 18.

The server system shown in FIG. 1 also preferably comprises a second bridge logic device 20 that bridges the primary expansion bus 16 to various secondary buses such as a low pin count (LPC) bus 22, a ROM bus 24, and the PCI bus 18. In the preferred embodiments, the north bridge 8 and the south bridge 20 are both members of chipset produced by Server Works, Inc. (a Broadcom Corporation subsidiary) of Irvine, Calif. More particularly, in the preferred embodiments the chipset utilized is a Grand Champion™ HE chipset.

In the preferred embodiment shown in FIG. 1, the primary expansion bus 16 comprises a Thin Intermodule Bus, a proprietary bus of the Server Works company. However, the server system shown in FIG. 1 is not limited to any particular type of chipset, and thus, the primary expansion bus may comprise any other suitable buses.

Referring still to FIG. 1, a read only memory (ROM) 26 couples to the south bridge 20 by way of the ROM bus 24. The ROM contains software programs executable by the CPUs 2. The ROM 26 preferably contains not only the programs necessary to implement the basic input/output system (BIOS), but the ROM 26 also preferably stores stackless code executed during the power on self test (POST) procedures, as well as dedicated pieces of software code that are executed based on the issuance of system management interrupts (SMIs) by various server system devices. The importance of the various pieces of software initially stored on the ROM (but copied into portions of the main memory arrays 4, 6 during execution) are discussed more fully below with respect to the various memory checking and memory error recovery techniques.

Still referring to FIG. 1, the server system of the preferred embodiment also comprises a super input/output controller (Super I/O) 28 that couples to the south bridge 20 by way of the LPC bus 22. The Super I/O performs many important functions, such as coupling a keyboard 30 and mouse 32 to the server, as well as being the coupling point for a floppy drive 34. Generally speaking, the Super I/O is referred to "super" because of the many input/output functions it performs. Also coupled to the south bridge 20 is a hard drive or hard disk 36. In the preferred embodiments the hard disk 36 couples to the south bridge 20 by way of the Peripheral Components Interconnect (PCI) bus 18. While only a single hard disk 36 is shown in FIG. 1, it will be understood that in an implementation where the computer system of FIG. 1 is a server, there may be multiple hard disks 36 operated as individual storage devices, or possibly in a redundant array of independent devices (RAID) configuration.

The preferred embodiments also comprise an integrated lights out processor 14 coupled to the south bridge and other server system components by way of the PCI bus 18. The integrated lights out processor 14 is preferably a microcontroller programmed to act as a gateway between the internet, or other network system, and the components of the server system. In the preferred embodiments, the integrated lights out processor 14 is powered by auxiliary power such that even if the overall server system is powered down, the integrated lights out processor 14 is operational and capable of communication. In this way, remote server control and diagnostics may be performed by a system administrator from the next room or the other side of the world.

The server system of the preferred embodiments also uses an off-the-shelf, commercially available operating system such as Windows® 2000 or Windows.Net by Microsoft, Inc. or Netware by Novell. As was discussed in the background section, however, Microsoft and other off-the-shelf products are generally offered to original equipment manufacturers (QEMs) as packaged products. This means that an OEM wishing to implement a design or features different from a competitor, yet still wanting to utilize the off-the-shelf operating system, is constrained to features that may be implemented independent of the operating system. Stated otherwise, if an OEM wishes to implement a design or feature that is not directly supported by the Windows® operating system, that design or feature must be implemented transparent to, and without the assistance of, the operating system. Inasmuch as the operating system is an all-pervasive feature in the execution of programs and the communication to and from hardware devices, implementing major changes in the computer system architecture that are transparent to the operating system are difficult. The preferred embodiments of the present invention, however, implement just such a change. In particular, the preferred embodiments are directed to a computer or server system in which the main memory arrays are implemented on memory boards 4, 6. These memory boards are preferably hot pluggable, meaning that the boards may be installed or removed from the computer or server while the server is operational. Hot plugging of the memory boards 4, 6 of the preferred embodiments is done without the knowledge of, or assistance of, the operating system. The operating system needs only to have the ability to adjust, from the operating system's perspective, the amount of memory in a system without requiring a reboot.

Referring again to FIG. 1, each of the memory boards 4, 6 couple to the north bridge by way of the memory bus 12. However, because these boards are removable while the computer system is operational, there needs to be a way to electrically isolate each of the boards prior to their removal, as well as prior to their insertion. In the preferred embodiments, this is accomplished by way of a series of bi-directional switches, known in the industry as quick-switches (QS) 38. Although it may be possible to install on a computer or server motherboard a plurality of individual quick-switches, the preferred embodiments use a Pericom Semiconductor Corporation Part No. P15C34171C digital bus switch. The bus switch may be alternatively referred to as a bi-directional multiplexor/de-multiplexor. The quick-switch 38 is preferably controlled by a programmable array logic (PAL) 40, whose operation will be discussed more thoroughly below. The PAL, however, controls coupling of the control and data buses of the memory bus 12 to each of the memory boards 4, 6.

In the transfer of data to and from the main memory boards 4, 6 and the north bridge 8, there is also the need to synchronize data transfers. In the preferred embodiments this is accomplished by sending not only the data along the buses to each of the memory boards 4, 6, but also forwarding a clock or strobe for each data grouping. In designs with large data buses, there may be multiple data groups that are electrically matched with a clock or strobe. Because the memory boards 4, 6 of the preferred embodiment are coupled, through the quick-switch 38, to a single set of data lines from the north bridge 8, the clocks or strobes may likewise be coupled to these devices through the quick-switch; however, the inventors of the present specification have found that while data signal integrity is not an issue in implementations using the quick-switch 38, the clocks or strobes have signal integrity problems. More particularly, data lines are typically sampled during rising or falling edges of a clock or strobe signal. If an address or data line has noise, which may be due in whole or in part to the "T" routing topology in coupling the memory boards 4, 6 through a quick-switch to the north bridge, this noise manifests itself during the set up times of the data information. However, these signals are typically sampled after their transitory period, such that the signal has obtained either a voltage significantly above or below the threshold in spite of any inherent noise. For clocks or strobes however, it is the transitional period (the rising or the falling edges) which trigger sampling of data bus lines within the system. Therefore, noise present in a clock or strobe which manifests itself during the transitory period may trigger sampling of data lines at improper times or cause double-clocking, which results in an incorrect data transfer. Thus, while coupling data lines through the "T" topology as shown in FIG. 1 may be acceptable, the inventors of the present specification have found that running the clocks or strobes in this "T" type topology may produce signal integrity problems which affect memory transfers. In order to address this problem, in the preferred embodiments each memory board 4, 6 implementing a memory array has two dedicated clocks or strobe lines from the north bridge for each data group. The two strobes for each data group are matched electrically with their associated data group. FIG. 1 shows only a single dedicated clock or strobe line 40 extending between the north bridge 8 and the memory board 4 for simplicity of the drawing; however, it will be understood that there are actually a plurality of matched pairs of strobe lines extending between the north bridge 8 and the memory board 4, one for each data group. Likewise, FIG. 1 shows only a single dedicated clock or strobe line 42 for the memory board 6 for simplicity of the drawings. It will understood that each of strobes line 40, 42 preferably carries precisely the same signal on a per-group basis, but because neither are routed in a "T" topology, the occurrence of constructive and destructive reflections are minimized. Because the strobes 40, 42 are coupled to the hot pluggable memory boards 4, 6 respectively, preferably each strobe 40, 42 has a corresponding electrically controlled switch 44, 46 respectively, to isolate the strobe signal from the memory board 4, 6 during installation or removal. FIG. 1 shows the electrically controlled switches 44, 46 implemented independent from the quick-switch structure 38, however, these switches may be individual switches as shown, or may be integrated within the quick-switch 38. Moreover, the programmable array logic 40, which controls opening and closing of the quick-switch device 38, also preferably controls the opening and closing of the electrically controlled switches 44, 46 for the strobe signals. It is noted that the Server Works chipset Grand Champion® HE may not have dual clock or strobe outputs 40, 42 as shown for each data group. Future versions of the Server Works chipset may inherently contain an additional clock or strobe output 40, 42 for each data group, and this too would be in the contemplation of this invention.

Figure 4:
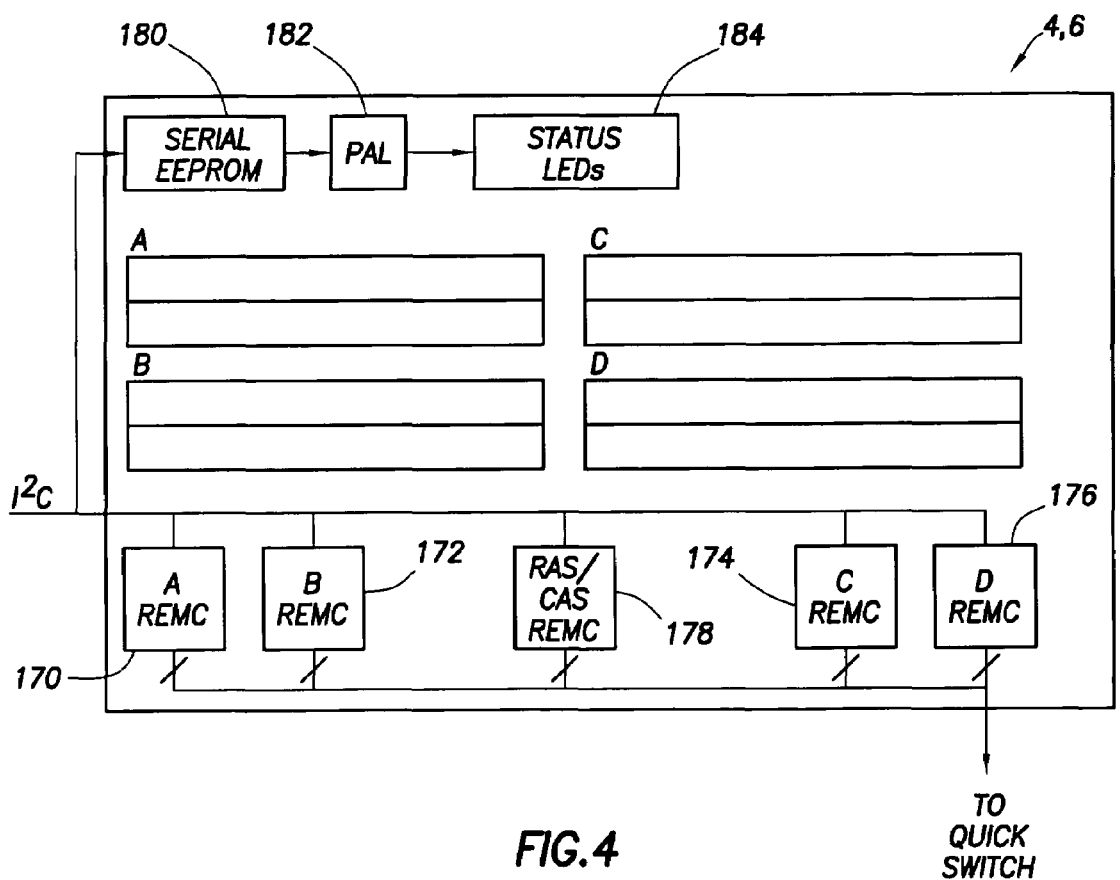
FIG. 4 shows, in block diagram form, a memory board of the preferred embodiments.

FIG. 4 shows a block diagram of a memory board constructed in accordance with preferred embodiments. In particular, each memory board of the preferred embodiments is capable of accepting up to eight DIMM modules. The memory preferably implemented in the DIMMs is DDR SDRAM ranging from 128 megabytes to 2.0 gigabytes per DIMM device. Thus, a single memory board may be capable of implementing up to sixteen gigabytes of RAM, and with two memory boards in a computer or server system up to 32 gigabytes may be implemented. Still referring to FIG. 4, each of the slots marked A, B, C, D is capable of accepting up to two DIMM modules. Associated with each of the groups A, B, C, D is a reliability enhanced memory controller (REMC). In particular, REMCs 170, 172, 174 and 176 are coupled to the DIMM module groups A, B, C and D. In the preferred embodiments the REMCs are manufactured by Server Works Inc., having a part no. NECD8491051012. An additional REMC device 178 preferably exists on each memory board, and this REMC device is responsible for generation of the row address strobe (RAS) and column address strobe (CAS) functions. Although not specifically shown in FIG. 4, each of the REMC devices 170, 172, 174, 176, 178 are coupled to the memory bus 12, and are thus capable of performing the steps necessary for reading and writing data from and to the memory board.

The memory boards of the preferred embodiment also implement a series of status LEDs to indicate to the user the status of the various DIMM devices, and/or the overall memory board, when the unit is installed in a server system. In particular, the memory board 4, 6 preferably comprises a serial electrically erasable programmable read only memory (EEPROM) coupled to the Inter-Integrated Communication ($I^2C$) bus. In the preferred embodiments, the serial EEPROM is a device manufactured by Philips Semiconductor having a part no. 9559. The serial EEPROM is preferably written across the serial 120 bus, and the registers written may be accessed in a parallel fashion. Thus, when either the ROM code or PAL 40 desire to light, or change the status of, one of the LEDs on the memory boards 4, 6, preferably a corresponding bit or pattern of bits in the serial EEPROM 180 is asserted. Thereafter, the PAL 182 reads the bit or code written to the serial EEPROM 180, and drives an appropriate LED in the plurality of the status LEDs 184. Moreover, the PAL 182 and the status LEDs 184 are preferably powered by the auxiliary power to the memory board 4, 6, and since the EEPROM, by its very nature, holds the desired state of the LEDs even through a power loss, a user installing a board 4, 6 into an operating system knows upon application of the auxiliary power the last state of the board and various DIMM modules on the board.

Figure 2A:
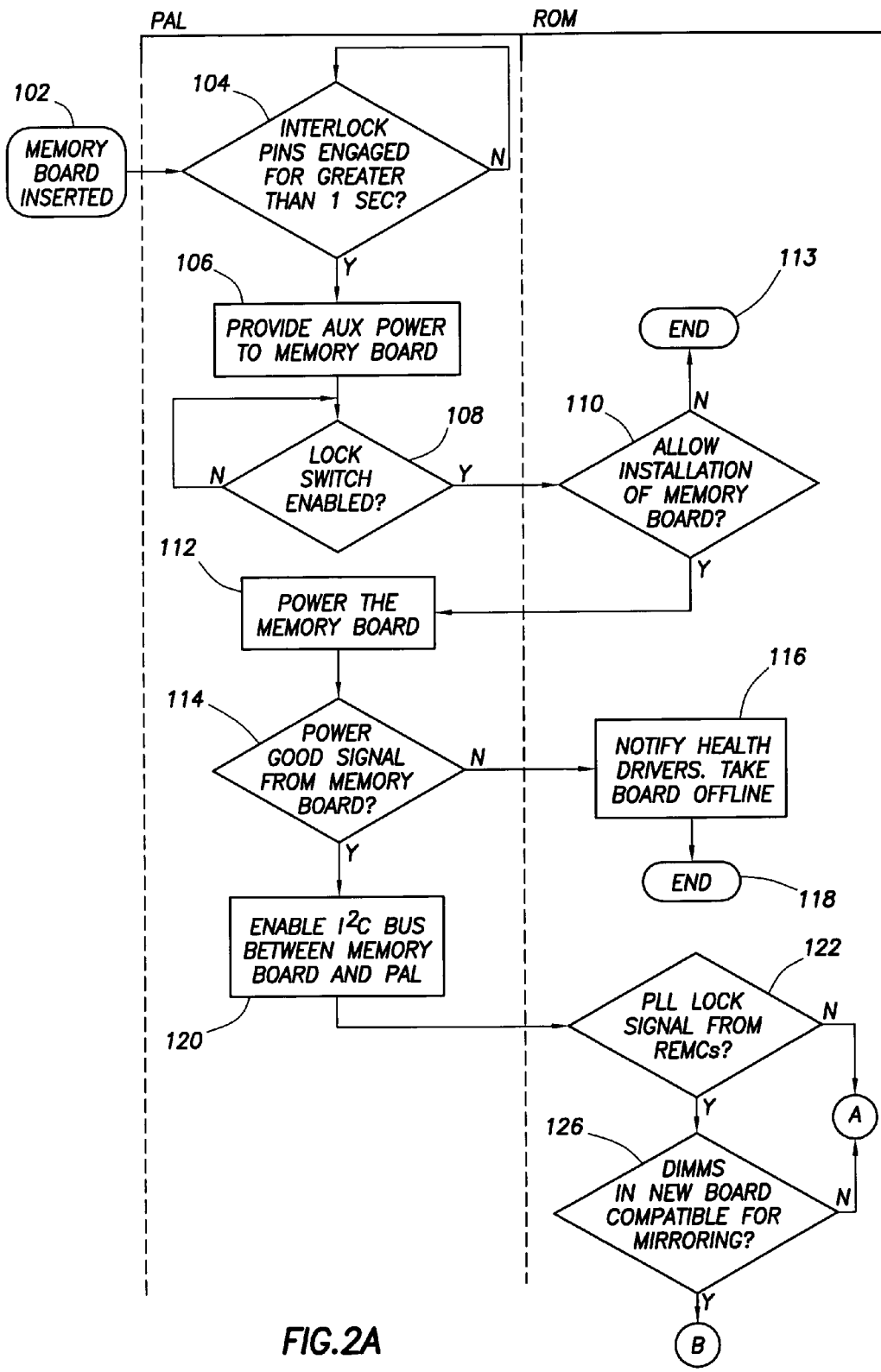
FIGS. 2A–C show a flow diagram for hot plug insertion of a memory board in accordance with the preferred embodiments.
Figure 2B:
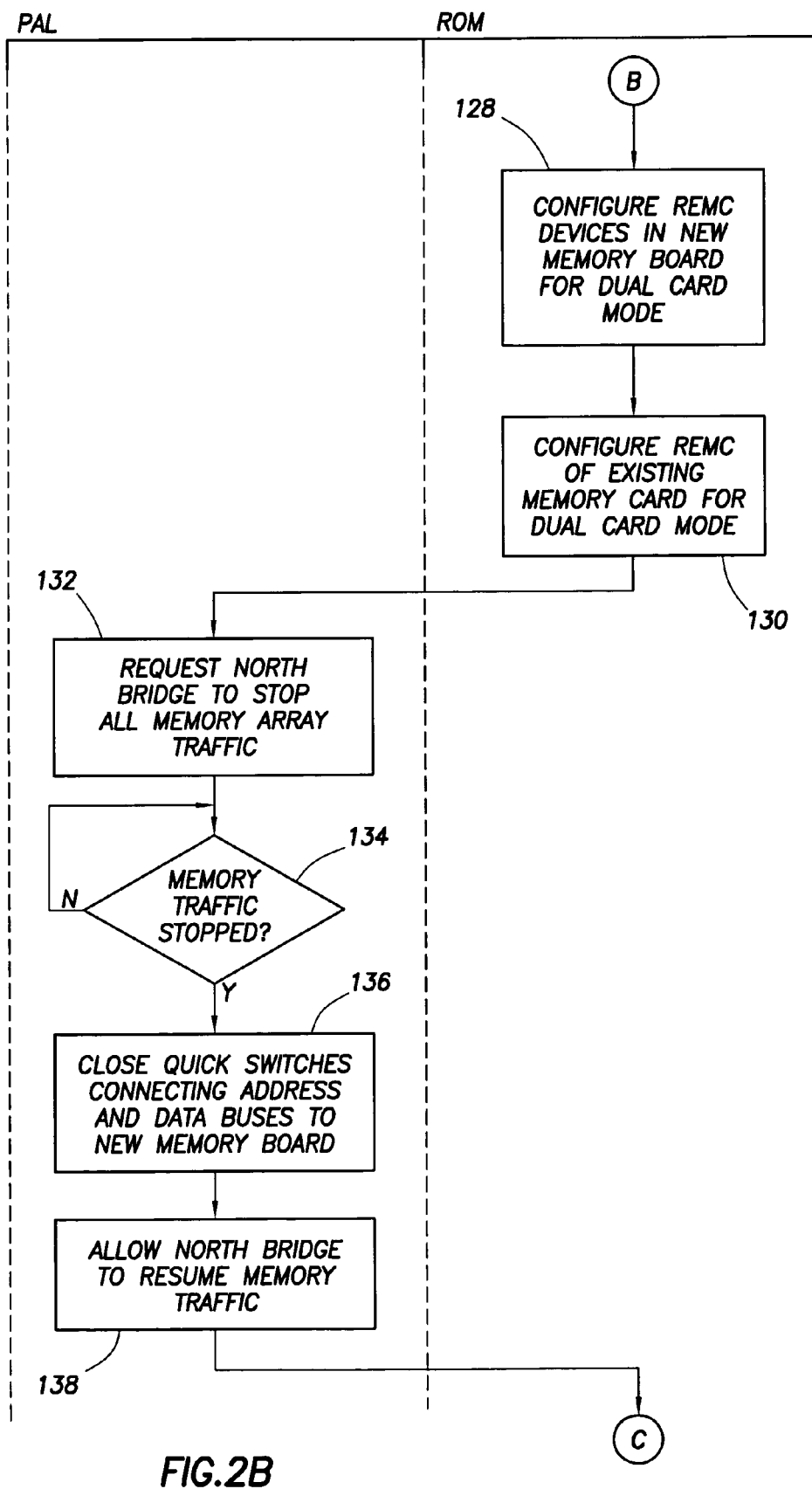
Figure 2C:
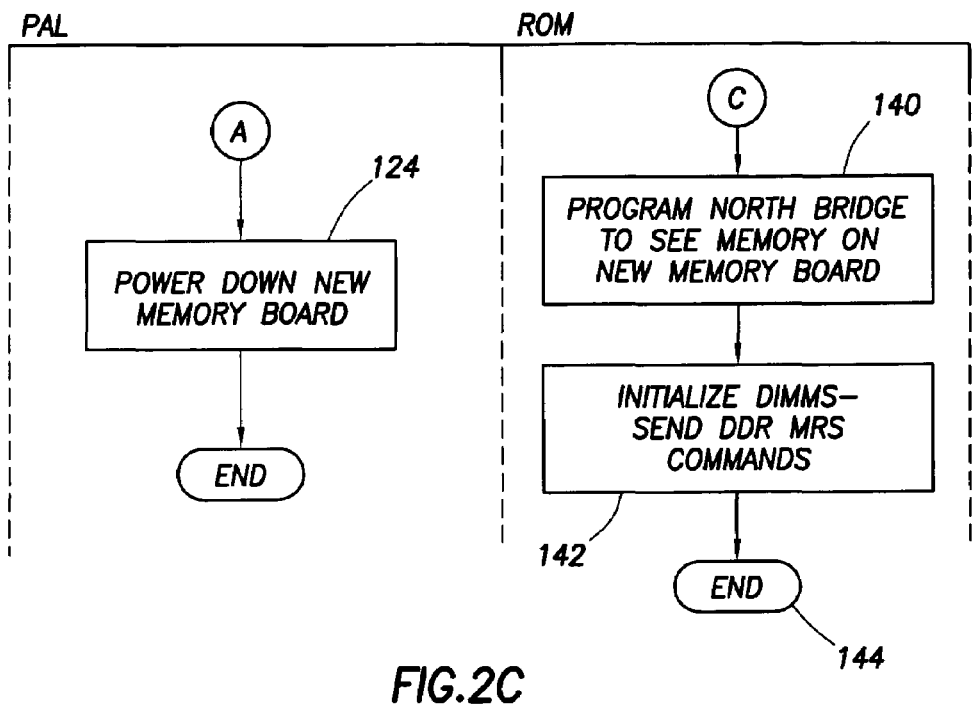

Having now discussed the hardware to implement the hot pluggable memory boards in a computer or server system, the discussion now turns to methods for hot plugging of the memory boards 4, 6 without the knowledge or assistance of the operating system. In particular, FIGS. 2A–C show a flow diagram of the steps for hot plugging of a memory board 4, 6. In addition to depicting the preferred steps for hot plugging a memory board 4, 6, FIGS. 2A–C also indicate that the devices or systems that perform the steps. In particular, the functions performed by software stored on the ROM are shown on the right-hand side, and functions performed by the programmable array logic 40 are generally shown on the left hand side of the flow diagram.

For purposes of discussion, consider a server, such as that shown in FIG. 1, in operation and having only a single memory board 4. Further consider that a user wishes to install a second board, for example, memory board 6, to add memory to the system. This additional memory may be used as a hot spare, may be operated as a mirrored version of memory board 4, may be considered as additional main memory assessable to the software programs operating on the server, or the like. Regardless of the reason for the installation, consider that a user physically installs a second memory board into the operating server, as indicated at step 102. In the preferred embodiments, the memory boards have two dedicated electrical contacts, interlock pins, on opposite ends of the card-edge connector, that short to each other. The purpose of the pins is to give the server the ability to determine if the memory board is completely and properly installed. For example, if the card is only partially installed in the card-edge connector, then electrical current will not flow from through the shorted pins. Preferably the PAL 40 monitors the corresponding pins in the connector in the server. When the interlock pins have been engaged for greater than one second (step 104), the programmable array logic 40 provides auxiliary power to the newly installed memory board (step 106). Next, the PAL 40 checks to see whether the mechanical lock switch, preferably actuated by the person installing the new memory board, has been closed (step 108). If the user does not mechanically lock the new memory board in place, then the process stalls at step 108 until this takes place. When the lock switch is enabled, the programmable array logic triggers the execution of software stored on the ROM 26.

Before continuing it should be pointed out the steps to hot plug a memory board into an operational system of the preferred embodiments are a combination of hardware, preferably implemented in PAL 40, and software, stored in the ROM 26. As one of ordinary skill in the art is aware, however, the software programs stored on the ROM 26, whether POST procedures, BIOS routines, or the like, are not executed directly from the ROM 26: but rather, early in the boot process are copied to a shadow ROM area on the main memory array present in the system. Though throughout the remaining discussion reference will be made to executing ROM code, it will be understood that this code, while permanently or semi-permanently stored on the ROM 26, is actually executed from the shadowed portion of the ROM in the main memory. It is also noted that in each instance where the PAL 40 is performing a task which invokes a portion of ROM code (a step that crosses the threshold between the PAL and ROM sections of FIG. 2A–C) this is, in actuality, accomplished by the PAL 40 issuing an SMI which uniquely identifies the ROM code to be executed. Thus, in transitioning between steps 108 and 110 of FIG. 2A, for example, it will be understood that the PAL 40 issues an SMI which invokes an appropriate piece of ROM code to perform the desired function.

Referring still to FIG. 2A, when the user locks the new memory board in place using the mechanical switch (not specifically shown), the PAL 40 detects this action and the process moves to a determination of whether electrical installation of the new memory board is allowed (step 110). For example, the new memory board installation may not be allowed if the original memory board is doing some form of self-mirroring. If installation of the new memory board is not allowed, the process ends (step 113). If, however, installation is allowed, the ROM sends a message to the PAL 40 indicating the acceptability of powering the newly installed memory board. Upon receiving the indication from the ROM to power the board, the PAL performs this function (step 112), and determines whether the new memory board has properly powered up by monitoring a signal from the new memory board (step 114). If the new memory board is not properly powered, the board is taken off line (step 116) and the process ends (step 118). In systems implementing health drivers, the ROM programs may also pass a status message to the health driver, such that the health driver may notify the user of the particular error with regard to the newly installed memory board. If, however, the power good signal from the newly installed memory board becomes asserted, the PAL preferably notifies the ROM through a status bit and enables an I²C bus (step 120), such that serial communications may take place between the ROM, PAL and the newly installed memory board. The PAL enables the I²C bus by operation of a switch device 5, 7 for the memory boards 4, 6 respectively.

Thereafter, the ROM code checks the state of the PLL-LOCK signal from the REMCs on the newly installed memory board. The failure to detect an asserted state of the PLL-LOCK signal indicates an error on the newly installed memory board, and in this case the newly installed memory board is powered down (step 124) and the process ends. Although not specifically called out in FIGS. 2A–C, the ROM code also verifies, by inspecting status bits in the REMC devices, that each REMC devices is correctly configured (as either a data REMC (170, 172, 174, 176) or an address REMC (178)). If the PLL-LOCK signal is detected (step 122), the ROM code next makes the determination whether the DIMMs in the newly installed memory board are compatible with the corresponding DIMMs in the originally installed memory board (step 126). If, as is the preferred embodiment, the newly installed memory board is to be used as mirrored memory, the number and type of memory devices in the newly installed memory board need to match the memory devices of the original memory board. At step 126 the ROM makes this determination. On the other hand, if the newly installed memory board is to be used as a hot spare, or additional memory, the constraints regarding the similarity of the memory devices on each of the memory boards may not be as stringent. One of ordinary skill in the art understands these requirements, and thus a more detailed discussion is not required.

If the DIMMs in the new board are compatible (step 126), the next step is the configuration of the REMC devices in the new memory card for dual card mode (step 128). The ROM code preferably performs this step by communicating with the various REMCs over the I²C bus. At this point the REMCs in the newly installed memory board have been programmed for dual card mode, but the new memory board has yet to be electrically coupled to the memory bus 12. Moreover, in the assumption of the server operating originally with a single memory board, the REMCs of the original memory board need to be programmed for dual card mode (step 130) prior to coupling of the new memory board to the memory bus 12.

After configuring the various REMCs for dual card operation, in the next step of the process the PAL 40 sends a command to the north bridge 8 to cease all memory traffic (step 132). As soon as the PAL 40 determines that traffic on the memory bus 12 is stopped (step 134) the PAL preferably closes the various switches contained in the quick-switch device 38 (step 136), which electrically couples the newly installed memory board to the memory bus 12 and correspondingly the original memory board. Thereafter, the PAL issues a command to the north bridge 8 indicating that it may resume memory traffic (step 138).

While at this point the newly installed memory board may be electrically coupled to the north bridge 8, the north bridge stills need to be informed of the presence of the memory on the memory board (step 140) such that use of that new memory may begin. Finally, the DIMMs on the new memory board are initialized by the ROM by the sending of the DDR MRS commands (step 142). Thereafter, the process of installing a memory board in an operation ends (step 144).

The next steps performed by the computer server system in which the new memory board has been installed is dependent upon the desired use of the new memory. If the additional memory card was simply to add memory to the system, then no further steps may be required other than using the new memory. If the intended use of the newly installed memory is to be a hot spare for existing memory, no further action need be taken until some triggering event occurs with respect to the primary memory. In the preferred embodiments, however, the newly installed memory is utilized in a mirroring fashion such that after initialization of the new memory the contents of the existing memory are copied in their entirety to the memory in the newly installed memory board, and the primary board is switched from the original memory board to the new memory board. For more information regarding the mirroring functionality of the preferred embodiments, reference may be had to the co-pending application Ser. No. 10/178,981 entitled "Hot Mirroring In A Computer System With Redundant Memory Subsystems" which is incorporated by reference herein as if reproduced in full below.

Figure 3:
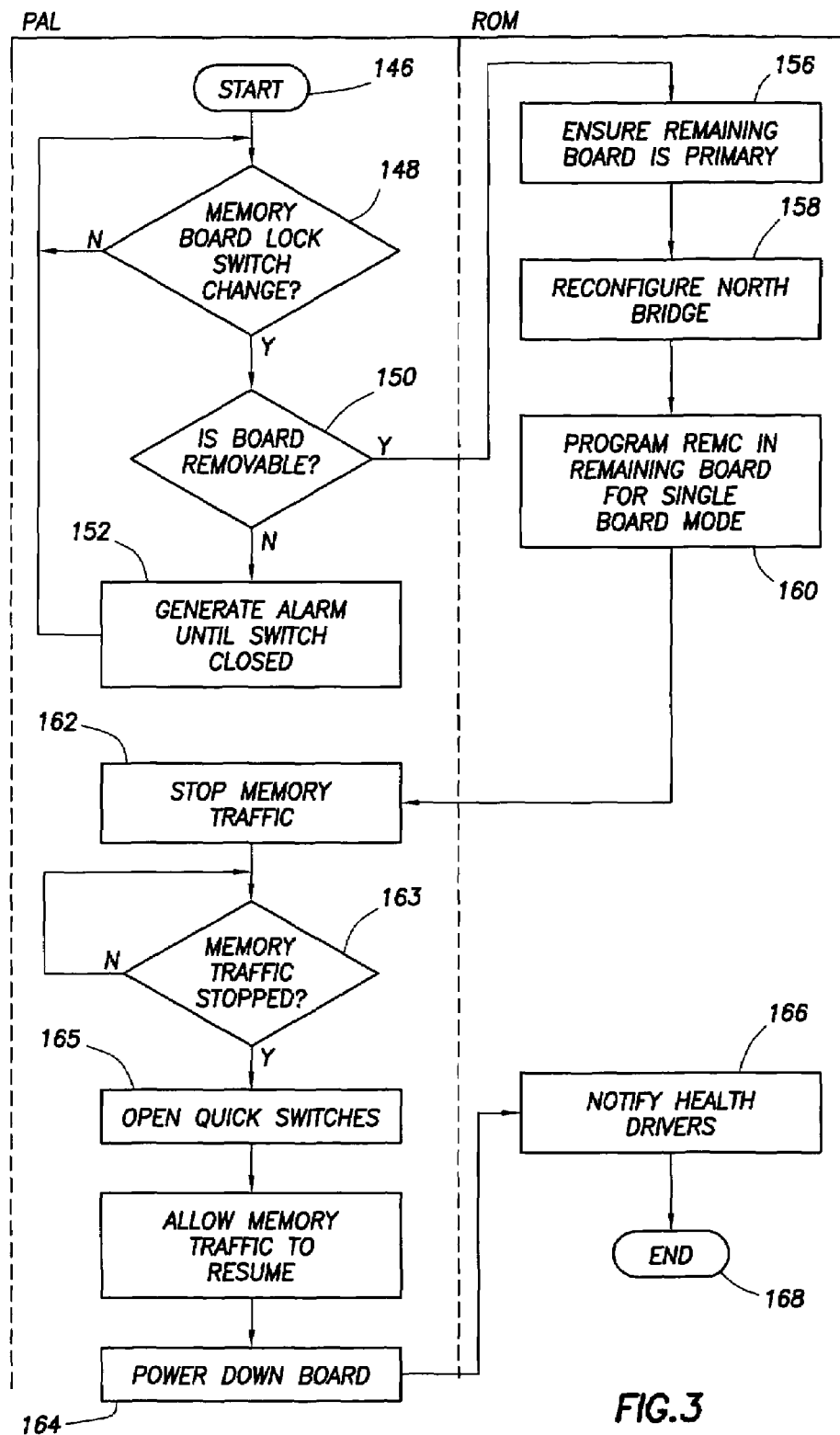
FIG. 3 shows a flow diagram for hot plug removal of a memory board in accordance with the preferred embodiments.

The computer server system of the preferred embodiments not only may accept a newly installed memory board during installation, but is also capable of sustaining operation during removal of a memory board. FIG. 3 shows a flow diagram of the steps implemented in the preferred embodiments for removal of a memory board during operation of the server. In particular, the process starts at step 146 and proceeds to a loop, implemented in the PAL 40, which watches for un-latching of the mechanical lock of the memory board (step 148). The next step in the process is a determination if the board for which the lock was just actuated is removable (step 150). A board may not be removable, for example, if it is the last memory board or if the other memory board has encountered errors. If the board is not removable, an alarm is generated (step 152) and remains until the user locks the switch again. If a user removes the board in spite of the alarms generated, the system will crash. If, however, the board is removable the next step is ensuring that the remaining board in the system is the primary board (step 156). Thereafter, the north bridge 8 is reconfigured for use of the memory present on the single board (step 158), and the REMCs of the single remaining board are reconfigured for single board operation (step 160). Thereafter, the PAL 40 disconnects the memory bus, by notifying the north bridge 8 to stop all memory traffic (step 162), waiting for the bus traffic to stop (step 163), disconnecting the quick-switch 38 (for the board to be removed (step 165)), and allowing memory traffic to resume (step 167). Thereafter, the board is powered down (step 164), and if the system implements health drivers, the driver is notified of the removal (step 166) and the process ends (step 168).

Having described the hardware of the preferred embodiments as well as discussion of the various steps used when memory boards are hot plugged to and from an operating computer or server, attention is now turned to a series of main memory error recovery and protection schemes implemented in the preferred embodiments. Writing to and reading from main memory is a crucial part of the operation of almost every software program, save the stackless operation of the POST. Thus, when a memory device experiences a catastrophic failure, this typically results in the computer or server system locking up, or experiencing what is affectionately referred to as the "blue screen of death." Thus, it is desirable in consumer devices as well as servers to implement, if possible, mechanisms to keep the computer or server from operating with memory that has an impending failure, or at least recovering, even if this recovery requires a reboot of the system, after a catastrophic failure of all or a portion of the main memory. However, and as was discussed with respect to the hot pluggable memory boards above, many companies that provide off-the-shelf operating systems, such as the Microsoft Windows® environment, do not support within their operating systems much, if any, main memory error detection and recovery mechanisms. The challenge for OEMs is to provide this functionality transparent to, and without the assistance of, the operating system.

The first opportunity a computer or server has to detect that some or all of its main memory may have experienced a catastrophic error is during the boot process. In the preferred embodiments, if a portion of the main memory, for example a complete memory board 4, 6, or one of the DIMM modules on a memory board 4, 6, are detected to be bad during the POST process, then that portion of the main memory is preferably "mapped out" of the available memory in the system and not used. FIG. 5 shows an exemplary flow diagram for determining the presence of failed memory during the POST process, mapping out of that memory, and allowing the computer or server to continue to boot and become operational (unlike prior art systems which simply lock up and cannot boot).

In particular, the process starts at step 186 and proceeds immediately to a primary processor of the plurality of processors executing the POST procedures from the ROM 26 (step 188). Because at this point in the process the memory controller of the north bridge 8 has yet to be initialized, the software executing the POST procedures is said to be "stackless," meaning that is completely executed from the L1 cache without stack (main memory) operations. The POST software thereafter examines status bits in the integrated lights out processor 14. Although not specifically called out in FIG. 5, there are two status bits of particular interest in the preferred embodiments. The first status bit is asserted if the computer or server system was forced to reboot by a watchdog timer. That is, in the preferred embodiments a watchdog timer is operational on the computer or server system. If the server is operating correctly, a driver within the server periodically resets the watchdog timer. If, however, the computer system locks up, for example because of a uncorrectable main memory failure (which are preferably logged to the SPD bytes, as discussed below), then there will not be a process sufficiently active to reset the timer. When the timer completes its count down (or equivalently its count up) it asserts one of the status bits in the integrated lights out processor 14 and reboots the system. The second status bit of interest is an indication that an error was detected during the previous POST procedure. If the POST code finds one of the status bits asserted (step 192) the user is notified of the error (step 194) and the process continues to step 196.

With regard to notifying the user that status bits were set, there are many alternative embodiments to perform this task. For example, the POST code could post a message to the video display during the boot process warning that the error had occurred. Alternatively, the POST code could activate a light emitting diode on the system to notify the user of the error. In yet another embodiment, the POST could send an appropriate message to the health driver, when activated. In the preferred embodiments, however, the presence of the asserted status bit is noted in an error log implemented in the integrated lights out processor 14.

Returning now to FIG. 5, the next step in the process is to make a determination whether any memory is present in the server system, and if so whether the memory representing the lower 128 kilo-bytes has uncorrectable memory errors (step 196). If this is the case, the POST code preferably sets an error bit in a non-volatile register (step 198) and the system reboots (step 200). If, however, there is memory present and at least that small portion is operational, the POST code preferably shadows the ROM memory to that location (step 200). Thereafter, the checksum of the shadowed ROM code is verified (step 202). If the checksum fails, an appropriate error bit is set in a non-volatile register (step 198) and the system is rebooted (step 200). If, however, the checksum is verified, the POST code preferably checks the remaining main memory for uncorrectable errors (step 204). It is preferred that all of the main memory is checked for uncorrectable errors; however, given that a computer or server of the preferred embodiments may have as much 32 gigabytes of main memory, verifying each and every location in the main memory may be time prohibitive. Thus, it is within the contemplation of this invention that only a portion of the total main memory may be verified during this step. If no uncorrectable errors occur, the process continues as normal (step 206). If, however, some portion of the main memory is found to have uncorrectable memory errors, then in the preferred embodiments that memory is effectively removed from the system (step 208). In the case where the reboot was a watchdog timer reset, the ROM preferable also inspects the SPD bytes of the main memory, and correspondingly removes the offending portions. Removal from the system may take several forms. In one aspect, if memory errors are found on a particular memory board, for example memory board 4, and the system is designed to operate the boards in a hot spare mode, then preferably the board that has memory experiencing uncorrectable errors is flagged as unusable and the remaining board is set as the primary memory board in the system. Alternatively, rather than removing an entire memory board upon experiencing uncorrectable memory errors, the portion of the memory board experiencing memory errors could be mapped out of the available memory in the system. Finally, if a portion of the main memory is found to be bad by the POST procedures, a status bit is set and the system is rebooted. Thus, if an error is detected by the POST procedures, the system will reboot at least once. While proceeding through the second boot process, the user is notified of the error in the previous boot cycle (step 194), but then the boot procedure continues. Because either the memory board is effectively no longer installed in the system, or because the memory areas experiencing uncorrectable faults have been mapped out before the second boot procedure, the second POST procedure should proceed without error (assuming that no additional areas experience uncorrectable errors). In this way, regardless of whether the memory experiences an error for the first time during the POST procedure, or whether the uncorrectable errors were previously experienced during operation, causing a system lock up and watchdog timer reset, the portion of the memory is removed thus allowing the computer or server to reboot and become operational. So although a computer or server may experience memory problems, those problems do not keep the server from becoming operational in most circumstances. This is an important feature of server systems, especially where those servers are operated in remote locations or where the errors occur at inconvenient times.

Yet another memory error recovery feature implemented in the preferred embodiments is the ability to take corrective action with respect to memory prior to the memory actually failing. Generally speaking, there are two types of memory errors—correctable and uncorrectable errors. Most computer systems implement some form of error correction codes (ECC) along with their important data. In the event that a small portion (for example just a few bits in a large file) are corrupted, the ECC allow the computer system to regenerate the corrupted bits, all transparent to the user. In the related art, attention is paid solely to the number of correctable errors experienced over the lifetime of a particular memory board, or DIMM on the memory board. When, in the related art, a threshold is exceeded for an absolute number of correctable errors, this is used as an indication of an impending uncorrectable error (multi-bit error), and some corrective action is taken. However, the prior art devices make the determination to take corrective action solely on the overall number of correctable errors, regardless of their frequency. Thus, if a particular DIMM experiences the threshold number of correctable errors in a matter of minutes, and a second DIMM experiences a threshold number of correctable errors over a matter of years, this is considered equivalent in the prior art. In the preferred embodiment of the present invention, however, the decision regarding whether to take corrective action with respect to the impending failure of a memory device is not based on the absolute number of failures experienced by that device, but rather the rate of those failures. Thus, the preferred embodiment logs correctable errors experienced by each of the DIMM modules on the memory boards 4, 6. This log is preferably placed in NVRAM, for example the NVRAM 191 of the integrated lights out processor 14. However, any accessible NVRAM within the system may be equivalently used for this function. Additionally, however, a programmable array logic 212, preferably coupled to the integrated lights out processor 14, is configured to generate a periodic signal to the integrated lights out processor. Upon assertion of this periodic signal, the integrated lights out processor preferably issues an SMI which invokes a portion of ROM code to clear the log of uncorrectable errors stored in the NVRAM 191. The frequency that the PAL generates the periodic signal may vary substantially, but in the preferred embodiments the PAL 212 asserts the periodic signal once per hour. Thus, the log of the correctable errors stored in the NVRAM 191 is preferably cleared once an hour. In this way, rather than notifying the user and taking action based on an impending failure of a DIMM as a function of the total number of correctable errors that DIMM has experienced, the preferred embodiments generate these signals and take corrective actions only based on a rate of errors experienced. Thus, the error signals generated a corrective action only if the number of uncorrectable errors reaches the threshold within the period of time set by the PAL 212.

Relatedly, in some circumstances a portion of main memory may experience an uncorrectable error, which in the preferred embodiments is noted and corrective action is taken, (for example switching to a mirrored memory board). However, sometimes the uncorrectable errors themselves are transitory, and when, for example, an OEM enters the system to diagnose the problem, the memory does not again experience the uncorrectable errors, making trouble-shooting and repair difficult. In order to address this problem, the preferred embodiments of the present invention log sufficient information to later identify the particular DIMM module, or specific location within the DIMM, that caused the error. More particularly, most commercially available memory devices, in addition to their significant random access memory locations, also have available to the user Serial Presence Detect (SPD) bytes, a set of nonvolatile RAM locations. In the preferred embodiments, as a DIMM module experiences uncorrectable failures, information is preferably written to the nonvolatile RAM portion of the DIMM module by way of the I$^2$C bus. Although it may be possible to have the operating system perform this task, in the preferred embodiments where package operating systems are used that do not have this feature, preferably an uncorrectable failure in a memory module causes the generation of a SMI, which in turn forces the execution of ROM code to take corrective action. The ROM code, in addition to the actions necessary to maintain the server in an operation state (if possible) as discussed above, also writes sufficient information to the SPD bytes of the ailing DIMM module for later trouble-shooting purposes. The errors, even if they may not be duplicated, may be sufficiently traced using the information contained in the SPD bytes and the offending DIMM module or modules repaired or replaced as necessary.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
    a microprocessor;
    a first memory board comprising random access memory (RAM);
    a second memory board comprising RAM;
    a first bridge device coupled to the microprocessor, the first bridge device also coupled to the first and second memory boards by way of a memory bus;
    a switch device coupled between the first bridge device and each of the first and second memory boards, the switch device selectively couples each of the first and second memory boards to the memory bus;

a logic device coupled to the switch device and the first bridge device that controls the selective coupling of each of the first and second memory devices by the switch device;

a read only memory (ROM) device coupled to the first bridge device, and wherein the ROM device stores programs executable by the microprocessor to configure the memory boards; and wherein either of the first and second memory boards may be selectively removed from and added to the computer system during operation of the computer system.

2. The computer system as defined in claim 1 further comprising a plurality of microprocessors, each microprocessor coupled to the first bridge device.

3. The computer system as defined in claim 2 wherein each of the microprocessors comprises an X86 based microprocessor.

4. The computer system as defined in claim 3 wherein the microprocessors further comprise Pentium® 4 Xeon microprocessors produced by Intel Corporation.

5. The computer system as defined in claim 1 further comprises a hard disk drive coupled to the microprocessor, and where the hard disk drive stores an operating system program executable by the microprocessors, and wherein the operating system does not support removal and adding of memory boards during operation of the computer.

6. The computer system as defined in claim 1 wherein the switch device further comprises a Pericom Corporation part No. P15C34171C demultiplexer bus switch.

7. The computer system as defined in claim 1 wherein the first bridge logic device and the second bridge logic device are part of a ServerWorks™ Grand Champion™ HE chipset manufactured by Server Works, Inc.

8. The computer system as defined in claim 1 wherein the logic device coupled to the switch device further comprises a programmable array logic (PAL).

9. The computer system as defined in claim 8 wherein the PAL selectively enables providing of auxiliary power to the first and second memory boards.

10. The computer system as defined in claim 8 wherein the PAL selectively enables providing of primary power to the first and second memory boards.

11. The computer system as defined in claim 8 wherein the PAL interfaces with the first bridge logic device to request a stoppage of main memory traffic prior to coupling to or de-coupling from the memory bus by one of the first and second memory boards.

12. The computer system as defined in claim 1 wherein the programs stored on the ROM are further configured to determine compatibility of memory modules on a newly installed memory board.

13. The computer system as defined in claim 1 wherein the programs stored or the ROM configure memory controllers on memory boards remaining in the computer system.

14. The computer system as defined in claim 1 wherein the programs stored on the ROM configure the first bridge logic device to properly use main memory added to or removed from the computer system during operation.

15. The computer system as defined in claim 1 further comprising:
a first strobe signal coupled between the first bridge logic device and the first memory board, the first strobe signal associated with a first data group;
a second strobe signal coupled between the first bridge logic device and the second memory board, the second strobe signal associated with the first data group; and
wherein the first and second strobe signals are substantially identical.

16. A method comprising:
installing a first main memory board, comprising a memory controller and a memory device, into an operational computer system having at least one preexisting main memory board;
coupling, under control of a logic device, the first main memory board to a memory bus of the computer system;
configuring the memory controller of the first main memory board for dual card operation;
configuring a memory controller of the preexisting memory board for dual card operation; and thereafter
utilizing memory on the first main memory board as at least one selected from the group; a hot spare, and a mirrored memory to the preexisting main memory board.

17. The method as defined in claim 16 wherein coupling the first main memory board to a memory bus of the computer system further comprises enabling auxiliary power to the first main memory board by the logic device.

18. The method as defined in claim 17 wherein coupling the first main memory board to a memory bus of the computer system further comprises enabling primary power to the first main memory board by the logic device.

19. The method as defined in claim 18 wherein coupling the first main memory board to a memory bus of the computer system further comprises:
requesting stoppage of main memory traffic in the computer system;
verifying stoppage of main memory traffic; then
closing a plurality of quick switch devices to electrically couple the first main memory board to control and data lines of a memory bus; and then
allowing resumption of main memory traffic.

20. The method as defined in claim 16 wherein configuring the first main memory board for use further comprises configuring the first main memory board for use by software programs stored on a read only memory device (ROM) and executed by a microprocessor.

21. A method comprising:
setting a status indicator on a removable electrical device to indicate a state of the removable electrical device, the setting comprising:
writing a non-volatile memory device on the removable electrical device; and
driving the status indicator based on a state of the non-volatile memory device, the driving comprising:
reading the state of the non-volatile memory by a programmable logic device;
driving the status indicator by the programmable logic device based on the state of the non-volatile memory;
retaining the state through removal and reinsertion of the removable electrical device.

22. A removable electrical device for a computer system, comprising:
a printed circuit card;
a non-volatile memory device on the printed circuit card, the non-volatile memory device couples to devices external to the removable electrical device across a communication bus;
a status indicator coupled to the non-volatile memory device, and wherein when the removable electrical device is installed in a computer system, the status indicator displays a status indication of the removable electrical device based on a state held by the non-volatile memory device; and wherein the removable electrical device retains the state through a removal from, and reinsertion into, a computer system, and wherein the status indicator displays the status indication after reinsertion.

23. The removable electrical device as defined in claim 22 wherein the printed circuit card further comprises:
a memory array;
a memory controller coupled to the memory array; and
wherein the removable electrical device is a removable memory module.

24. The removable electrical device as defined in claim 22 wherein the non-volatile memory device further comprises a serially addressable non-volatile memory device.

25. The removable electrical device as defined in claim 24 wherein the serially addressable non-volatile memory device further comprises a serial electrically erasable programmable read only memory (EEPROM).

26. The removable electrical device as defined in claim 25 wherein the communication bus is an Inter-Integrated Communication (I²C) serial bus.

27. The removable electrical device as defined in claim 22 wherein the status indicator further comprises a light emitting diode (LED).

28. The removable electrical device as defined in claim 22 wherein the non-volatile memory device further comprises a serially addressable non-volatile memory device.

29. The removable electrical device as defined in claim 28 wherein the serially addressable non-volatile memory device further comprises a serial electrically erasable programmable read only memory (EEPROM).

30. The removable electrical device as defined in claim 29 wherein the communication bus is an Inter-Integrated Communication (I²C) serial bus.

31. A removable electrical device for a computer system, comprising:
a printed circuit card;
a non-volatile memory device on the printed circuit card, the non-volatile memory device couples to devices external to the removable electrical device across a communication bus;
a status indicator coupled to the non-volatile memory device, and wherein when the removable electrical device is installed in a computer system, the status indicator displays a status indication of the removable electrical device based on a state held by the non-volatile memory device;
a programmable array logic (PAL) coupled between the non-volatile memory and the status indicator, and wherein the PAL reads the state from the non-volatile memory, and drive the status indicator,
wherein the removable electrical device retains the state through a removal from, and reinsertion into, a computer system, and wherein the status indicator displays the status indication after reinsertion.

32. The removable electrical device as defined in claim 31 wherein the state held in the non-volatile device is one of an asserted or non-asserted state of a bit in the non-volatile memory.

33. The removable electrical device as defined in claim 32 wherein the state is a pattern of bits held in the non-volatile memory.

34. A removable memory board for a computer system comprising:
a means for holding and electrically coupling electronic devices;
a means for non-volatile storage of state on the means for holding coupled to external devices across a communication bus means;
a means for creating a visual indication of state coupled to the means for non-volatile storage; and
wherein the removable memory board retains the state through a removal from, and reinsertion into, a computer system, and wherein the means for creating a visual indication indicates the state after reinsertion into the computer system.

35. The removable memory board as defined in claim 34 wherein the means for non-volatile storage further comprises a serially addressable non-volatile memory device.

36. The removable memory board as defined in claim 35 wherein the serially addressable non-volatile memory device further comprises a serial electrically erasable programmable read only memory (EEPROM).

37. The removable memory board as defined in claim 34 wherein the means for creating a visual indication of state further comprises a light emitting diode (LED).

38. A computer system comprising:
a microprocessor;
a first memory board comprising a memory controller and random access memory (RAM);
a second memory board comprising a memory controller and a RAM;
a bridge device coupled to the microprocessor, the bridge device also coupled to the first and second memory boards by way of a memory bus;
a switch device coupled between the bridge device and each of the first and second memory boards, the switch device selectively couples each of the first and second memory boards to the memory bus;
a logic device coupled to the switch device and the bridge device, the logic device controls the selective coupling of each of the first and second memory devices by the switch device;
a read only memory (ROM) device coupled to the first bridge device, and wherein the ROM device stores programs executable by the microprocessor to configure the memory boards; and
wherein either of the first and second memory boards may be selectively removed from and added to the computer system during operation of the computer system.

39. The computer system as defined in claim 38 further comprises a hard disk drive coupled to the microprocessor, and wherein the hard disk drive stores an operating system program executable by the microprocessor, and wherein the operating system does not support removal and adding of memory boards during operation of the computer.

40. The computer system as defined in claim 38 wherein the programs stored on the ROM configure the memory controllers on memory boards in the computer system.

41. A removable memory module for a computer system, comprising:
a printed circuit card;
a memory controller mechanically coupled to the printed circuit card; and
a memory device mechanically coupled the printed circuit card, and electrically coupled to the memory controller;
wherein the memory controller is configurable to operate in a computer system having a single removable memory module, and wherein the memory controller is configurable to operate in a computer system having a plurality of removable memory modules wherein when the removable memory module operates in a computer system having a plurality of memory modules, the removable memory module operates as a hot spare.

42. The removable memory module as defined in claim 41 further comprising:
   a plurality of memory controllers; and
   a plurality of memory devices electrically coupled to the plurality of memory controllers.

43. The removable memory module as defined in claim 41 further comprising:
   a non-volatile memory device mechanically coupled to the printed circuit card, the non-volatile memory device couples to devices external to the removable memory module across a communication bus;
   a status indicator mechanically coupled to the printed circuit card, and electrically coupled to the non-volatile memory device, and wherein when the removable memory module is installed in a computer system the status indicator displays a status indication of the removable memory module based on a state held by the non-volatile memory device; and
   wherein the removable memory device retains the state through a removal from, and reinsertion into, a computer system, and wherein the status indicator displays the status indication after reinsertion.

44. A removable memory module for a computer system, comprising:
   a printed circuit card;
   a memory controller mechanically coupled to the printed circuit card, wherein the memory controller is configurable to operate in a computer system having a single removable memory module, and wherein the memory controller is configurable to operate in a computer system having a plurality of removable memory modules;
   a memory device mechanically coupled the printed circuit card, and electrically coupled to the memory controller;
   a non-volatile memory device mechanically coupled to the printed circuit card, the non-volatile memory device couples to devices external to the removable memory module across a communication bus;
   a status indicator mechanically coupled to the printed circuit card, and electrically coupled to the non-volatile memory device, and wherein when the removable memory module is installed in a computer system the status indicator displays a status indication of the removable memory module based on a state held by the non-volatile memory device;
   a programmable array logic (PAL) mechanically coupled to the printed circuit card, and electrically coupled between the non-volatile memory and the status indicator, and wherein the PAL reads the state from the non-volatile memory, and drives the status indicator;
   wherein the removable memory device retains the state through a removal from, and reinsertion into, a computer system, and wherein the status indicator displays the status indication after reinsertion.

* * * * *

UNITED STATES PATENT AND TRADEMARK OFFICE
CERTIFICATE OF CORRECTION

PATENT NO. : 7,035,953 B2 Page 1 of 1
APPLICATION NO. : 10/179001
DATED : April 25, 2006
INVENTOR(S) : Jeoff M. Krontz et al.

It is certified that error appears in the above-identified patent and that said Letters Patent is hereby corrected as shown below:

In column 5, line 41, delete "(QEMs)" and insert -- (OEMs) --, therefor.

In column 6, line 12, delete "P15C34171C" and insert -- PI5C34171C --, therefor.

In column 7, line 20, delete "Champion®" and insert -- Champion™ --, therefor.

In column 7, line 61, delete "120" and insert -- $I^2C$ --, therefor.

In column 11, line 36, delete "much," and insert -- many, --, therefor.

In column 15, line 29, in Claim 6, delete "P15C34171C" and insert -- PI5C34171C --, therefor.

In column 15, line 53, in Claim 13, delete "or" and insert -- on --, therefor.

In column 16, line 16, in Claim 16, delete "group;" and insert -- group: --, therefor.

In column 17, line 52, in Claim 31, delete "indicator," and insert -- indicator; --, therefor.

Signed and Sealed this

Fourteenth Day of April, 2009

JOHN DOLL
*Acting Director of the United States Patent and Trademark Office*